United States Patent
Wilson

(10) Patent No.: US 6,728,050 B2
(45) Date of Patent: Apr. 27, 2004

(54) CAPACITANCE SKIP WRITE DETECTOR

(75) Inventor: David Robert Wilson, Platteville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 250 days.

(21) Appl. No.: 09/874,771

(22) Filed: Jun. 5, 2001

(65) Prior Publication Data

US 2002/0039244 A1 Apr. 4, 2002

Related U.S. Application Data

(60) Provisional application No. 60/236,322, filed on Sep. 28, 2000.

(51) Int. Cl.⁷ .................................................. G11B 27/36
(52) U.S. Cl. ........................ 360/31; 360/77.03; 360/75; 360/60; 360/53
(58) Field of Search ................................ 360/25, 77.03, 360/78.11, 31, 75, 60, 48, 53; 324/210, 212, 226

(56) References Cited

U.S. PATENT DOCUMENTS

| | | | |
|---|---|---|---|
| 4,931,887 A | * 6/1990 | Hegde | 360/75 |
| 5,168,483 A | * 12/1992 | Oka | 360/66 |
| 5,483,392 A | * 1/1996 | Ishida | 360/77.03 |
| 5,909,334 A | 6/1999 | Barr et al. | |
| 6,141,312 A | 10/2000 | Masters et al. | |

OTHER PUBLICATIONS

Maxtor Whitepaper "Maxsafe" Mar. 22, 1999.
Western Digital Web Page "Fly Height Monitor Improves Hand Drive Reliability" Jun. 25, 1999.

* cited by examiner

*Primary Examiner*—Alan T. Faber
(74) *Attorney, Agent, or Firm*—Merchant & Gould, P.C.

(57) ABSTRACT

The present invention offers an apparatus and associated method to detect a skip write error occurring during a data storage device write process. The capacitance between the read/write head and the disc surface, called the "parasitic capacitance," is used to determine whether a skip write error has occurred. The amount of parasitic capacitance is determined by monitoring the frequency change at the input of an oscillator of test circuit. A change in the read/write head fly height causes a change in the parasitic capacitance and a corresponding change in the frequency. The parasitic capacitance is compared to a threshold limit to determine whether a skip write error has occurred. The write operation is suspended when a skip write error is detected and a rewrite procedure is instituted.

14 Claims, 6 Drawing Sheets

CAPACITANCE SKIP WRITE DETECTOR

RELATED APPLICATION

This application claims priority of U.S. provisional application Serial No. 60/236,322, filed Sep. 28, 2000.

FIELD OF THE INVENTION

This application relates generally to the field of information storage and more particularly to a method and apparatus for verifying that data written on a storage disc can be reliably recovered during subsequent read operations.

BRACKGROUND OF THE INVENTION

The need for larger capacity data storage devices has become critical with the staggering pace of advances in computer technology. The most common data storage device used within computers today is the disc drive. The amount of data that can be stored on a disc drive has increased dramatically in recent years. Coupled with the need for larger storage capacity is a desire to increase the information throughput of the drive (i.e., increase the rate at which information is stored to and retrieved from the disc drive).

Most disc drives are composed of one or more magnetic media discs attached to a spindle. A spindle motor rotates the spindle and discs at a constant high speed. An actuator assembly adjacent to the disc(s) has actuator arms extending over the discs, each with one or more flexures extending from each actuator arm. A read/write head is mounted at the distal end of each of the flexures. The read/write head includes an air bearing slider enabling the head to "fly" in close proximity above the corresponding surface of the associated disc. The distance between the read/write head and the surface of the associated disc during disc drive operation is called the "fly height." Information is stored on and retrieved from a disc via the read/write head.

Information is stored on the disc surface as a bit. A bit is represented by a "1" or "0," which corresponds to a change or lack of change, respectively, in the orientation of adjacent magnetic domains on the disc surface. A domain's magnetic orientation is changed using the disc drive's write element. A write element is essentially an inductive coil. A magnetic field is generated around the write element by passing a current through the coil. The magnetic flux of the generated field, if strong enough, orients the magnetization direction of a magnetic domain located on the disc surface. The direction of the current in the write element dictates the direction of the magnetic flux of the generated field, and subsequently, the orientation direction of the magnetic domain.

As mentioned above, the strength of the magnetic field present at the disc surface must be strong enough to orient the magnetic domain. The strength of the magnetic field relative to the disc surface decreases as fly height increases. The magnetic field relative to the disc surface may not be strong enough to change the magnetic domain's orientation if the fly height becomes too great. One solution is to increase the strength of the magnetic field. The strength of the magnetic field, however, must be limited to prevent changing the orientation of adjacent domains located on the disc surface. The fly height of the read/write head, therefore, is critical to insure that the generated magnetic field is sufficient to change the orientation of the desired magnetic domain without changing the orientation of adjacent magnetic domains.

Information is retrieved from the disc surface using the read element. The read element senses orientation changes of the magnetic domains on the disc surface. The changes in the magnetic domain orientations create an electrical signal in the read element. The read element must be very sensitive to detect the orientation changes of the small magnetic domains. The disc drive's preamplifier is used to amplify the resulting signal before the signal is sent to the disc drive controller. Again, the fly height of the read/write head is critical to insure that the read element is close enough to the disc surface to detect the orientation changes in the magnetic domains such that an electrical signal is produced within the read element.

Each disc is radially divided into a finite number of concentric tracks to facilitate organization of the stored bits. Each track is a certain width and is separated from the adjacent tracks by a "blank space." This blank space prevents information stored in one track from overlapping the information stored in an adjacent track. The number of tracks located on each disc surface is known as the "track density." Each track is linearly subdivided into sections, called segments. Bits are written to and read from these segments by the read/write head. The linear density of bits stored within each segment is called the "bit density."

The product of track density and bit density is known as "areal density." The recent trend being followed by disc drive manufacturers is to increase the recording media's areal density so that the amount of data stored can be increased without increasing the physical size or the number of discs used in a drive. For example, the areal density of early disc drives was less than 1 gigabits per square inch (Gbits/sq. inch), whereas today, disc drives with areal densities greater than 40 Gbits/sq. inch are being tested. Manufacturers increase areal density by increasing both track density and bit density. Track density is increased by narrowing the track width and/or narrowing the width of the blank spaces between tracks. Bit density is usually increased by increasing the recording speed in order to record higher frequency bits. A higher frequency bit is smaller, and therefore, takes up less space on the disc surface.

An increase in areal density has a direct effect on the fly height of the read/write head. The write element must fly closer to the disc surface when writing information at higher areal density because the "blank space" and track width become smaller. A decrease in fly height is necessary to insure that the magnetic field present at the disc surface is strong enough to change the desired domain's orientation without overwriting information stored in an adjacent track. Likewise, the read element must fly closer to the disc surface when retrieving information from a disc with higher areal density because the smaller bits generate a smaller magnitude signal within the read element. The fly height, in summary, must become smaller in order for the read and write operations to be completed effectively as areal density increases.

The fly height in current disc drives has decreased to less than 1 microinch ($\mu$-in). A small contaminate particle, vibration, external shock, or a disc surface defect, among others, can affect disc drive performance at such low flying heights. For example, a dust particle that hits the read/write head can cause the read/write head to "bounce" away from the surface of the disc. If this bounce occurs while information is being written to the disc, the magnetic field generated by the write element may not be strong enough, relative to the disc surface, to change the desired domain's orientation and accurately record the information on the disc. This problem is known in the art as a "skip write" or "skip write error."

Most disc drives are manufactured in a clean room environment in order to prevent the presence of contaminate particles in an assembled disc drive. Most clean rooms are Class 100 clean rooms. Class 100 means that 100 contaminate particles per-liter-of-air are present in the room. Class 100 clean rooms were adequate for older disc drives with higher fly heights, but current disc drives require Class 10 clean rooms. Class 10 means that only 10 contaminate particles per-liter-of-air are present in the room. The amount of filtering needed to reach and maintain Class 10 status dramatically increases the cost of the disc drive manufacturing process.

Disc drive manufacturers place filters within the disc drive to trap the contaminate particles introduced during the manufacturing process. The filters also trap contaminate particles emitted from the drive's components during normal operation. The filters require between 100 and 200 hours of normal drive operation to effectively capture the contaminate particles. A brand new drive, however, is usually used by industry testing facilities during benchmark testing (i.e., performance testing); before the internal filters have had an opportunity to trap the contaminate particles. The likelihood that a contaminate particle will cause a skip write during benchmark testing is high. The detection and correction of a skip write error during benchmark testing adversely affects the disc drive's performance rating. Any degradation of performance during benchmark testing can lead to a decrease in consumer demand for the particular disc drive being tested. Additionally, detection and correction of a skip write error during normal disc drive operation adversely affects the user's computing efficiency.

Disc drive manufacturers address skip write problems by using read verification and/or fly height monitoring. Read verification consists of reading the information that was stored during the write operation and comparing the information actually stored to the information intended to be stored. If the information actually stored differs from the information intended to be stored beyond an acceptable level, a likely skip write error is detected. A subsequent write operation is completed when a skip write error is detected and another read verify operation is completed to insure that the subsequent write operation was successful. This process continues until a successful write operation is completed at that disc location, or the information may be stored at a different disc location after a predetermined number of write attempts have failed. The additional read, compare, and write steps of the read verify operation, however, take a large amount of time and adversely affect the performance rating of the disc drive.

A second method of determining whether a skip write error has occurred is fly height monitoring. For example, the fly height of the write element can be monitored during normal write operations by determining the ratio of the magnetic pulse area to the magnetic pulse peak. An increase in the flying height of the read/write head corresponds to an increase in the magnetic pulse area, and therefore, an increase in the measured ratio. The writing process can be suspended and recovery procedures can be instituted if the ratio between the magnetic pulse area and magnetic pulse peak indicates that an acceptable fly height has been exceeded. Such a method requires complicated computations to determine the magnetic pulse area, the magnetic pulse peak, and the ratio between the area and peak.

Accordingly, there is a need for an apparatus and associated method of detecting whether a successful write operation has been completed and of correcting for an unsuccessful write operation that does not require a read verification procedure or complicated fly height computations.

SUMMARY OF THE INVENTION

Against this backdrop, embodiments of the present invention have been developed to determine whether a successful write operation has been completed. Embodiments of the present invention offer an apparatus and associated method to monitor the fly height of the read/write head during a write operation. The fly height can be used as an indication of whether the write operation was completed successfully. Embodiments of the present invention can be used for various types of storage systems such as magnetic and optical disc drives among others, however, a magnetic disc drive has been used to illustrate an embodiment of the present invention.

Accordingly, a preferred embodiment of the present invention relates to an apparatus and associated method monitoring the fly height of a read/write head to determine whether a skip write error is occurring. The fly height is determined by monitoring the parasitic capacitance between the write element and the disc surface. The amount of parasitic capacitance corresponds to the distance between the write element and the disc (i.e., the fly height). A change in parasitic capacitance causes a frequency change in an oscillator of a test circuit. The amount of parasitic capacitance is determined and compared to a predetermined threshold level to ascertain whether the fly height remains within an acceptable range, or a skip write error is occurring. The write operation is suspended when a skip write error is detected and a rewrite procedure is instituted.

Thus, a preferred embodiment of the present invention relates to an apparatus and associated method for determining the fly height of a read/write head by monitoring the parasitic capacitance present between the read/write head and a disc surface. The apparatus includes a test circuit, connected to the closed-loop write circuit created by the write element and the write element electrical leads, to determine the parasitic capacitance and to compare the amount of parasitic capacitance to a predetermined threshold value. The test circuit includes an oscillator, a frequency modulation detector, a filter circuit, a sample-and-hold circuit having a time constant, a comparator, a threshold trigger level circuit, and various capacitive and inductive elements among others. The test circuit is sensitive to frequency changes caused by a change in the amount of parasitic capacitance between the write element and the disc surface. The test circuit uses the change in frequency to determine the amount of parasitic capacitance, and ultimately, the fly height of the write element. The test circuit compares the fly height of the write element to a predetermined threshold to determine whether a skip write error is occurring.

Embodiments of the present invention do not require a read verification step to be completed, nor do embodiments of the present invention require complicated computations to determine whether a skip write error has occurred. Therefore, embodiments of the present invention increase the disc throughput; in other words, the speed that data can be stored and retrieved from the disc. Furthermore, embodiments of the present invention immediately achieve the increase in throughput; eliminating the 100 to 200 hours of operation usually needed by the disc's internal filters to trap contaminate particles. Therefore, the need for more stringent clean room filtering can be reduced because acceptable performance can be achieved even though higher contaminate levels might be present in the disc drive.

These and various other features as well as additional advantages which characterize embodiments of the present invention will be apparent from a reading of the following detailed description and a review of the associated drawings.

DETAILED DESCRIPTION

The present invention offers an apparatus and associated method to monitor the fly height of the read/write head during a write operation. The fly height can be used as an indication of whether the write operation was completed successfully. The present invention can be used for various types of storage systems such as magnetic and optical disc drives among others; however, a magnetic disc drive has been used to illustrate an embodiment of the present invention.

Figure 1:
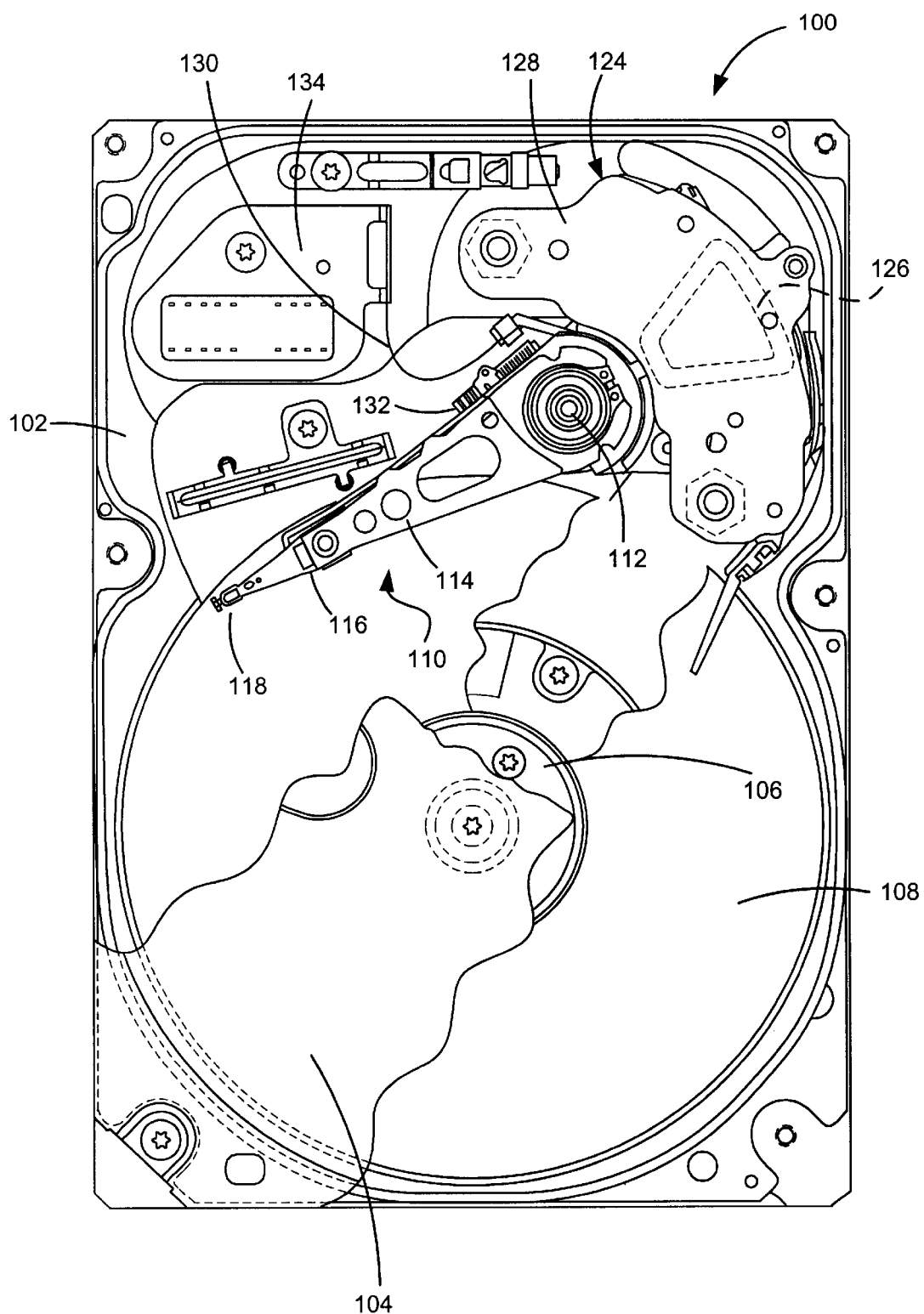
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106, which rotates one or more discs 108 at a constant high speed. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air-bearing slider enabling the transducer head 118 to fly in close proximity above the corresponding surface of the associated disc 108. A read element (not shown) and a write element (not shown) are located on the transducer head 118 and are used to retrieve and store information on the disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108.

The spindle motor 106 is typically de-energized when the disc drive 100 is not in use for extended periods of time. The transducer heads 118 are preferably moved over park zones near the inner diameter of the discs 108 when the drive motor is de-energized. The transducer heads can be secured over the park zones through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a preamplifier 132 to which read element and write element electrical leads (not shown) are connected; the electrical leads being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100. The printed circuit board includes a controller (not shown) that is capable of completing read and write operations (among others). Alternatively, the controller may be located external to the disc drive 100. A write operation, managed by the controller, includes applying a write current to the write element via the write element electrical leads.

Figure 2:
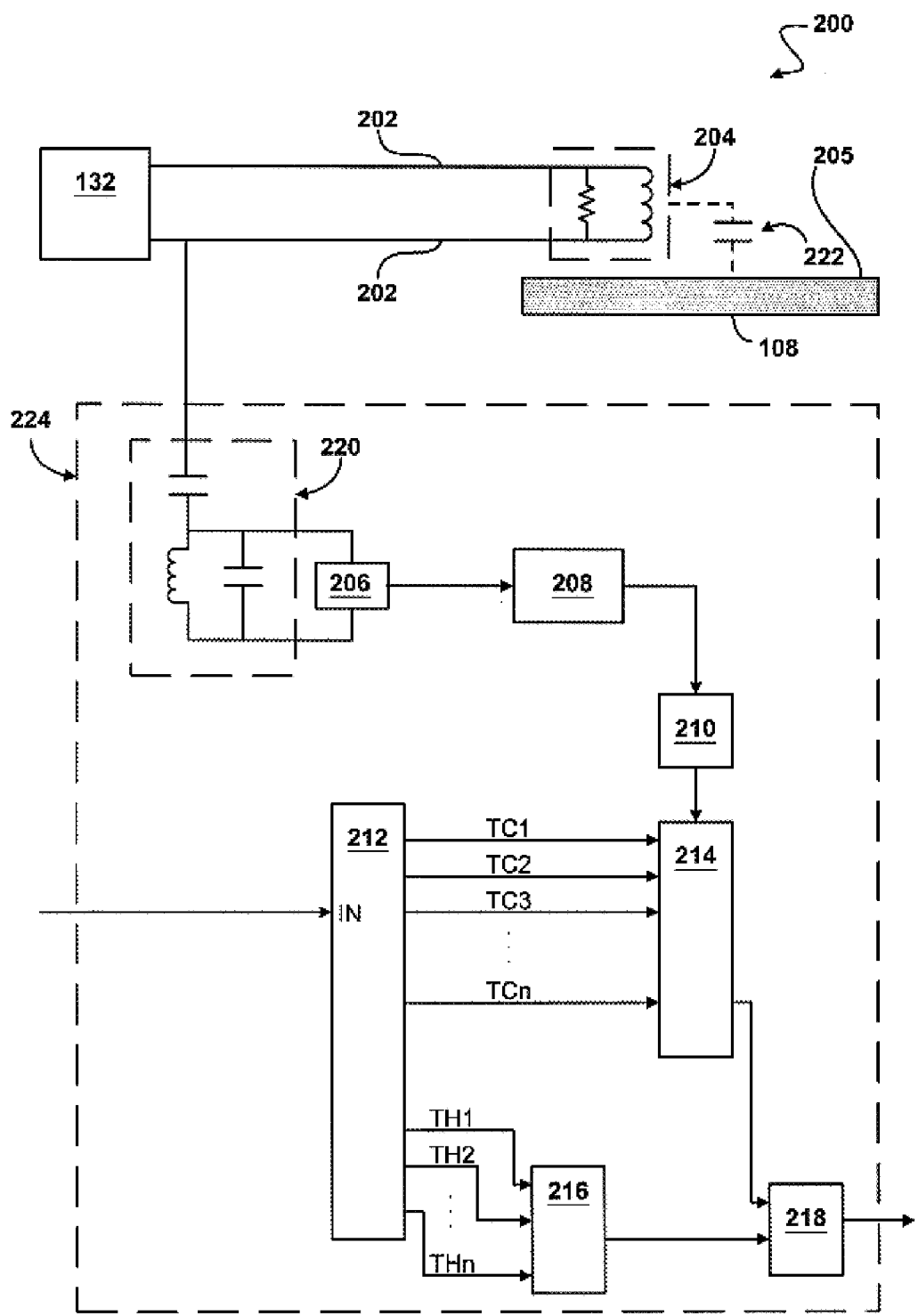
FIG. 2 illustrates a circuit for determining the transducer head's fly height according to a preferred embodiment of the present invention.

Circuitry for determining a transducer head's 118 fly height according to a preferred embodiment of the present invention is shown in FIG. 2. The write element 204 of the transducer head 118 is connected to the preamplifier 132 by write element electrical leads 202. The write element 204 and the write element electrical leads 202 form the write circuit. The write circuit is a balanced, closed-loop electrical circuit.

A parasitic capacitance 222 develops between the write element 204 and the surface 205 of the disc 108. The parasitic capacitance 222 occurs because the write element 204 and the disc 108 reside at different potentials relative to ground. The amount of parasitic capacitance 222 is dependent on the fly height, or the distance between the write element 204 and the surface 205 of disc the 108. In other words, an increase in the fly height causes a decrease in the parasitic capacitance 222.

A test circuit 224 is balanced with the write element electrical leads 202. The test circuit 224 can comprise a mode-rejection circuit that rejects the write current applied to the write element 204 during a write operation. The test circuit also acts outside of the bandwidth of the preamplifier 132 and the read/write head 118, such that the test circuit does not interfere with the operation of the read/write head 118. The test circuit 224, in a preferred embodiment, is embedded on the preamplifier 132, before a head select matrix, such that a single test circuit 224 can monitor the fly height of every read/write head 118 of the disc drive 100.

The front-end components 220 of the test circuit 224 include capacitive and inductive components among others. The values of the front-end components 220 are selected to balance the test circuit 224 to the write circuit such that the elements of the write currents common to each write element electrical lead 202 are ignored and the operation of the read/write head 118 is unaffected.

The front-end components 220 are connected to an oscillator 206. Oscillator 206 can be any electronic or mechanical device whose output is varied by changing an input frequency, voltage, or capacitance value among others. The capacitive and inductive components of the balanced front-end components 220 establish the "baseline" frequency at the input of the oscillator 206. The baseline is the frequency sensed by the oscillator 206 when the write element 204 is at its optimal flying height during nominal operation. A corresponding baseline output frequency is also established at the output of the oscillator 206. The front-end components 220 are chosen such that the value of the baseline output frequency is outside the common mode loop and outside the preamplifier/head bandwidth. The write currents do not affect the test circuit 224, and likewise, the test circuit 224 does not affect read/write head's 118 operation when the balanced front-end components 220 are chosen appropriately.

The output of the oscillator 206 of the preferred embodiment is dependent on the frequency of the input signal to the oscillator 206. In a preferred embodiment, an increase in the frequency of the oscillator's 206 input signal causes a frequency increase in the output signal of the oscillator 206. The oscillator 206 input signal's frequency increases when the parasitic capacitance 222 decreases. An increase in the fly height of the head 118 relative to the disc 108 causes a decrease in the parasitic capacitance 222 present between the write element 204 and the disc 108. The decrease in parasitic capacitance 222 causes an increase in the frequency of the oscillator's 206 input signal, which in turn, causes an increase in the frequency of the output signal of the oscillator 206. According to a preferred embodiment of the present invention, the frequency of the output signal of the oscillator 206 is monitored to detect a write skip error during a write operation. The write operation is suspended if a write skip error is detected.

The output signal of the oscillator 206 is sent to a frequency modulation ("FM") detector 208. FM detector 208 is a circuit used to detect frequency deviations in the output signal of the oscillator 206. The frequency deviations are caused by a change in the parasitic capacitance 222. The change in parasitic capacitance 222 can be caused by a contaminate particle, vibration, or external shock among others. FM detector 208 uses the baseline output frequency of the oscillator 206 as a reference-point to eliminate the expected variations in the parasitic capacitance 222. Expected variations in parasitic capacitance 222 refer to slight changes in fly height caused by wind turbulence or actuator assembly 110 mechanical forces among others. In other words, FM detector 208 searches for the large, low frequency excursions from the baseline oscillator 206 output that likely correspond to skip-write events. The output of the FM detector 208 is then sent to a low-pass filter 210.

Low-pass filter 210 is designed to reject signals within a specific frequency range. Low-pass filter 210 is implemented using either active (transistors and op-amps among others) or passive devices (capacitors, resistors, and inductors among others). In a preferred embodiment of the present invention, low-pass filter 210 is tuned as needed to eliminate any high frequency variations likely caused by other events such as wind turbulence or actuator assembly 110 mechanical forces among others.

The filtered signal from low-pass filter 210 is then sent to sample-and-hold circuit 214. Sample-and-hold circuit 214 is designed to retrieve the filtered signal, and upon receiving a hold command, hold constant the value of the filtered signal it possessed when the hold command was issued. The hold command can be issued for a specified time, called the time constant.

The sample-and-hold circuit 214, in a preferred embodiment, has a time constant set to correspond to the amount of time required for the read/write head 118 to traverse a finite number of sectors on the disc 108. The time constant is selected according to which "zone" of the disc 108 the read/write head 118 is flying over. A zone consists of a group of adjacent tracks 120 on the disc 108. A track 120 is placed into a zone according to the time required for the head 118 to traverse a sector in the track 120. The time required varies for each zone due to the different linear speeds of the disc 108 at various radial locations. For example, the amount of time needed for the head 118 to traverse a sector in a zone located at the outer diameter of disc 108 is different than the amount of time needed in a zone located at the inner diameter of the disc 108 because the linear speed of the disc 108 as seen by the head 118 is greater at the outer diameter of the disc 108.

The time constant is adjusted through the use of micro-code or software among others. The time constant is reset when the controller is completing a seek operation and moving the read/write head 118 to another location on the disc 108. In a preferred embodiment, register 212 is used to set the time constant of the sample-and-hold circuit 214. As shown in FIG. 2, a micro-code or software command is sent to the input or register 212. One of several time constants (TC1, TC2, TC3, . . . TCn) is chosen, depending on which zone the head 118 is flying over, to be used by the sample-and-hold circuit 214. After the period set by the time constant expires, the sample-and-hold circuit 214 is released and another sample of the filtered signal is taken. The output of the sample-and-hold circuit 214 is sent to one of the inputs of comparator circuit 218.

Register 212, in a preferred embodiment, is also used to store predetermined threshold limits chosen by the manufacturer. A predetermined threshold limit corresponds to the maximum deviation from a desired (or nominal) fly height allowed by the manufacturer. In other words, the threshold limit indicates the desired minimum and maximum fly heights. The predetermined threshold limits are changed using micro-code or software among others. Register 212 transmits a selected predetermined threshold limit (TH1, TH2, . . . THn) to threshold trigger level circuit 216, which outputs a signal corresponding to the amount of permissible deviation from the desired fly height to comparator circuit 218.

Comparator circuit 218 compares the output signal of the threshold trigger level circuit 216 to the output of sample-and-hold circuit 214. Comparator circuit 218 is implemented using transistors, op-amps, capacitors, resistors, and inductors among others. Comparator 218 issues a "set error" signal to the controller (not shown) if the threshold limit is exceeded, thereby indicating that a write skip or other write problem is occurring. The controller, upon receiving the "set error" signal, suspends the write operation and implements a rewrite operation.

Figure 3:
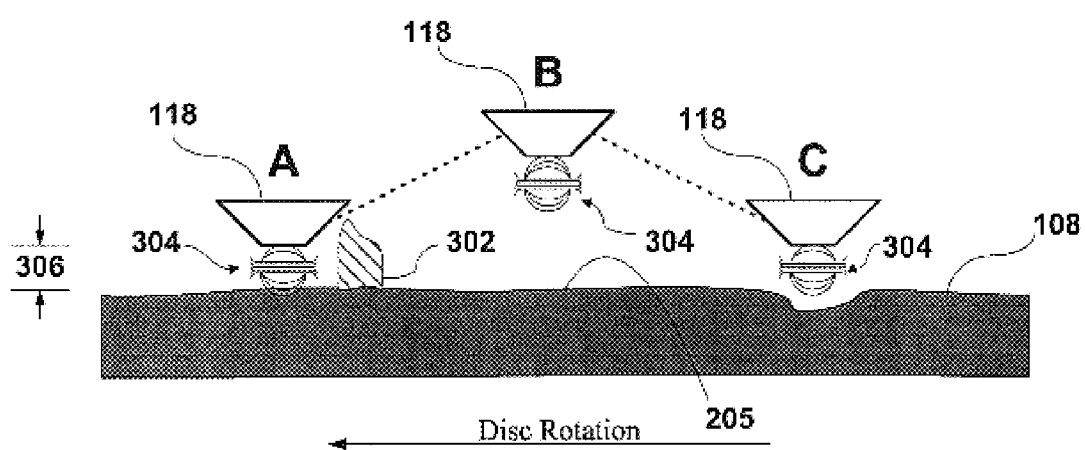
FIG. 3 illustrates a skip write condition addressed by an embodiment of the present invention.

FIG. 3 illustrates a skip write condition addressed by an embodiment of the present invention. The read/write head 118 is shown in various locations (i.e., positions "A", "B", and "C") relative to the surface 205 of the rotating disc 108. Read/write head 118 is shown at a nominal fly height 306 in position A. The strength of the magnetic field 304, relative to the disc 108, generated in read/write head 118 during a write operation is sufficient to orient the magnetic domains on the disc 108 surface at position A. Therefore, any information that was being written to the disc 108 while the read/write head 118 was located at the nominal flying height 306 is adequately stored on the disc 108.

Read/write head 118, as shown in FIG. 3, encounters a contaminate particle 302 as disc 108 rotates. Contaminate particle 302 causes read/write head 118 to "bounce" and move away from the surface 205 of disc 108 as shown in position B. The strength of the magnetic field 304 relative to the disc 108, generated in read/write head 118 during a write operation, is not sufficient to orient the magnetic domains during a skip write condition. Therefore, any information that was being written to the disc during this "bounce" or skip write is not adequately stored on the disc 108. The manufacturer determines the upper threshold limit that the read/write head 118 may deviate above the nominal fly height 306. If the upper threshold limit is exceeded a rewrite operation can be implemented.

Read/write head 118 then attempts to return to the nominal flying height 306 after reaching its peak at position B. Imperfections on the disc's 108 surface, for example, may prevent the nominal flying height 306 from being reached. Position C shows such a disc 108 surface imperfection. The strength of the magnetic field 304, relative to the disc 108, generated in read/write head 118 during a write operation may still be sufficient, however, to orient the magnetic domains at position C. The manufacturer, in this case, may have determined that the deviation from nominal fly height 306 does not warrant a rewrite procedure. In other words, the slight deviation from the nominal fly height 306 did not exceed the exceed threshold limit set by the manufacturer.

Embodiments of the present invention can also be applied to detect problems arising from a fly height that is less than the nominal fly height 306 by an amount defined by a lower threshold limit that the read/write head 118 may deviate. For the purpose of the following description, the "threshold limit" means a predetermined parasitic capacitance associated with either an upper fly height limit or a lower fly height limit, or a pair of limits defining a range of expected variation of the fly height between an upper and lower limit.

Figure 4:
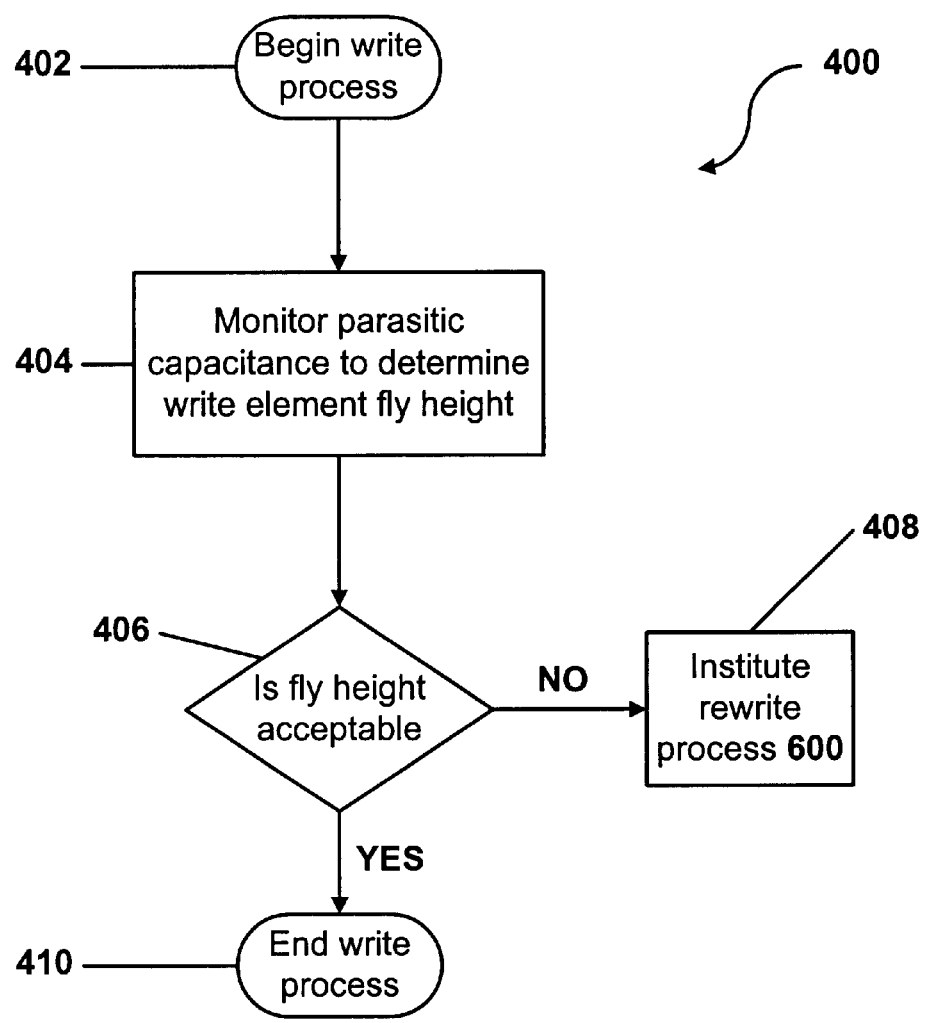
FIG. 4 is a flow chart of the operational process for determining the write element fly height according to a preferred embodiment of the present invention.

FIG. 4 is a flow chart of the operational process 400 for determining that the write element fly height is acceptable according to a preferred embodiment of the present invention. Operational process 400 is implemented when write process 402 begins. A write process 402 in a disc drive 100 may include, among other steps, transmitting a write current through the write element electrical leads 202 to the write element 204 such that a magnetic field 304 is generated by the write element 204 and information is stored to disc 108. In a typical disc drive 100, the disc controller sends the write current through the preamplifier 132, across the write element electrical leads 202, and through the write element 204. Although a typical magnetic media disc drive 100 has been used to illustrate the preferred embodiment, embodiments of the present invention can be applied to storage devices that use a different write process than described herein.

Operation 404 assumes control after the write process 402 begins. Operation 404 monitors the amount of parasitic capacitance 222 between the write element 204 and the disc 108. The amount of parasitic capacitance 222 is directly related to fly height (i.e., the distance between the write element 204 and the disc 108).

Operation 406 determines whether the fly height during the write process 402 is acceptable for reliable data storage. Data is considered to have not been reliably stored to the disc 108 if the fly height, found by monitoring the amount of parasitic capacitance 222, exceeds the predetermined threshold limit. Operational control branches NO if the parasitic capacitance 222 exceeds the predetermined threshold limit and operation 408 assumes control. Operation 408 institutes rewrite process 600. If the parasitic capacitance 222 does not exceed the predetermined threshold limit, the data is considered reliably safely written and operational control branches YES. Operation 410 then assumes control and the successful write process 402 is ended.

Figure 5:
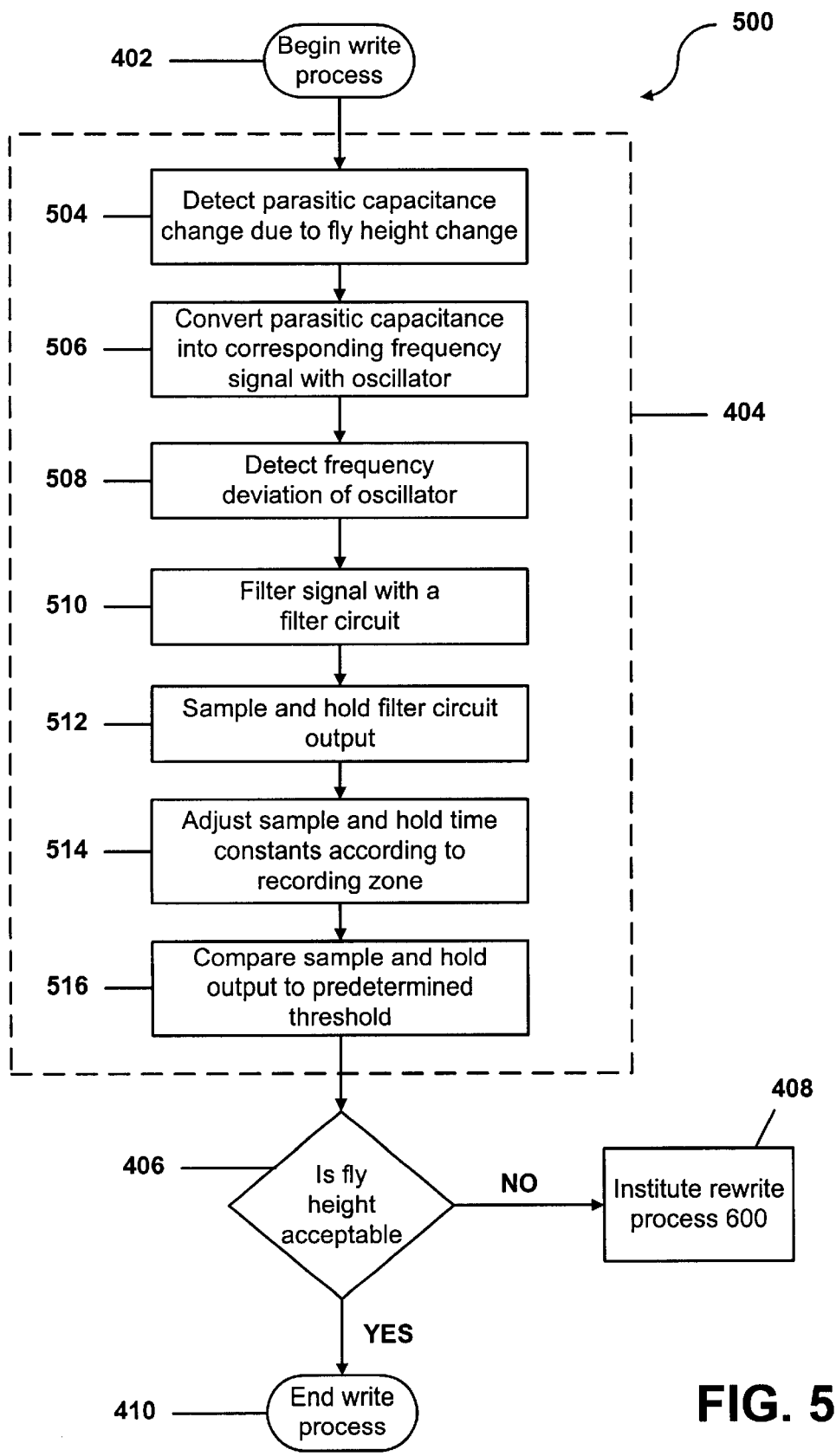
FIG. 5 illustrates a detailed embodiment of the operational process for determining the write element fly height according to a preferred embodiment of the present invention.

FIG. 5 illustrates a detailed embodiment of operational process 404 as implemented in operational process 500 for determining the write element fly height according to a preferred embodiment of the present invention. Operational process 500 is implemented when write process 402 begins. A write process 402 in a disc drive 100 may include, among other steps, transmitting a write current through the write element electrical leads 202 to the write element 204 such that a magnetic field 304 is generated by the write element 204 and information is stored to disc 108. In a typical disc drive 100, the disc controller sends the write current through the preamplifier 132, across the write element electrical leads 202, and through the write element 204. Although a typical magnetic media disc drive 100 has been used to illustrate the preferred embodiment, embodiments of the present invention can be applied to storage devices that use a different write process than described herein.

Operational control is assumed by detection step 504, which detects the change in the parasitic capacitance 222 between the write element 204 and disc 108. The change in parasitic capacitance 222 is directly related to the change in fly height of the write element 204 relative to the disc 108. In other words, an increase in the fly height causes a decrease in the amount of parasitic capacitance 222. In a preferred embodiment, test circuit 224 is used to detect the change in parasitic capacitance 222.

Operation 506 assumes control once the change parasitic capacitance is detected in operation 504. Operation 506 converts the change in parasitic capacitance 222 into a corresponding frequency signal. In a preferred embodiment, oscillator 206 of the test circuit 224 converts the change in parasitic capacitance 222 into a corresponding frequency signal. The output of the oscillator 206 is dependent on the frequency of the signal present at the input of the oscillator 206. In other words, the change in parasitic capacitance 222 causes the frequency of the oscillator's 206 input signal to change, which in turn, causes the frequency of the oscillator's 206 output to change.

The oscillator 206 is a circuit having an output signal whose frequency is dependent on the frequency of the signal applied to the input of the oscillator 206. The frequency of the output signal of the oscillator 206 of the preferred embodiment increases as the frequency of the input signal to the oscillator 206 increases. However, embodiments of the present invention can be implemented with an oscillator 206 that has an output signal that is inversely related to the input signal. For example, an oscillator 206 whose output signal frequency decreases as the input signal frequency increases can be used among others. The oscillator 206 can be any electronic or mechanical device whose output is varied by changing an input voltage, capacitance, or frequency among others. In the preferred embodiment, an increase in the fly height of the write element 204 causes a decrease in the parasitic capacitance detected by the test circuit 224 and an increase in the frequency of the input of oscillator 206, which in turn, causes an increase in the frequency of the output signal of oscillator 206. Operational control is then passed to operation 508.

Operation 508 detects the frequency deviation caused by a change in the parasitic capacitance 222. In a preferred embodiment, operation 508 utilizes FM detector 208 to recognize relatively large frequency variations in the output signal of the oscillator 206 caused by a change in the parasitic capacitance 222. FM detector 208 is a circuit that, in effect, detects a relatively large variation in the parasitic capacitance 222 likely caused by a contaminate particle, vibration, or external shock among others. FM detector 208 uses the baseline frequency output of oscillator 206 as a reference-point to eliminate the expected variations in the parasitic capacitance 222. Expected variations in parasitic capacitance 222 refer to slight changes in fly height likely caused by wind turbulence or actuator assembly 110 mechanical forces among others. In other words, FM detector 208 searches for the relatively large, low frequency excursions from the baseline frequency output of the oscillator 206 that likely correspond to skip-write events. Operation 508 outputs a signal corresponding to the frequency change caused by a change in the parasitic capacitance 222. Operation 508 then surrenders control to operation 510.

Operation 510 assumes operational control from operation 508 and filters the signal sent from operation 508. In a preferred embodiment, low-pass filter 210 is used to filter the output of the FM detector 208 used by operation 508. Low-pass filter 210 is designed to reject signals within a specific frequency range. Low-pass filter 210 can be implemented using either active (transistors and op-amps among others) or passive devices (capacitors, resistors, and inductors among others). Low-pass filter 210 is tuned as needed to eliminate any high frequency variations likely caused by effects other than a skip write error, such as wind turbulence or actuator assembly 110 mechanical forces among others.

Operation 512 assumes control after operation 510 has filtered the output of operation 508. Operation 512 receives the filtered output of operation 510, and upon receiving a hold signal, holds the value of the filtered output constant for a specified time. In a preferred embodiment, a sample-and-hold circuit 214 receives the output of the low-pass filter 210 used by operation 510, and upon receiving a hold signal, holds the value of the low-pass filter 210 constant for a time specified by a time constant. The sample-and-hold circuit 214, in a preferred embodiment, has a time constant equal to the amount of time required for the read/write head 118 to traverse a finite number of sectors on the disc 108.

Operation 514 assumes control once the output of operation 510 is sampled and held by operation 512. Operation 514 adjusts the time constant used in operation 512. In a preferred embodiment, the time constant is selected according to which "zone" of the disc 108 the read/write head 118 is flying over. A zone consists of a group of adjacent tracks 120 on the disc 108. A track 120 is placed into a zone according to the time required for the head 118 to traverse a sector in the track 120. The time required varies for each zone due to the different linear speeds of the disc 108 encountered by the head 118 relative to the disc 108 at various radial locations.

For example, after encountering a contaminate particle, the read/write head 118 in a zone located near the inner diameter of disc 108 will be relatively higher than the nominal fly height for a particular time, say approximately ⅘ of a sector (depending on the relative linear speed between the head 118 and the disc 108). However, if the head 118 encountered the same particle in a zone located near the outer diameter of the disc 108, the total time that the head 118 will be relatively higher than the nominal fly height will be larger, say equal to approximately 2 sectors, because the linear speed is higher near the outer diameter of the disc 108.

The time constant is selected through the use of microcode or software among others. The time constant is reset when the controller is completing a seek operation and moving the read/write head 118 to another location on the disc 108. Register 212 is used to set the time constant of the sample-and-hold circuit 214. As shown in FIG. 2, a microcode or software command is sent to the input of register 212. The command selects one of several time constants (TC1, TC2, TC3, . . . TCn), depending on which zone the head 118 is flying over, to be used by the sample-and-hold circuit 214. After the period set by the time constant expires, the sample-and-hold circuit 214 is released and another sample of the filtered signal is taken.

Operation 516 assumes control from operation 514. Operation 516 compares the output of the filter circuit held by operation 512 to a predetermined threshold limit. In a preferred embodiment, operation 516 compares the output of the low-pass filter circuit 210, held by the sample-and-hold circuit 214, to the threshold limit, retrieved from the threshold trigger level circuit 216. The threshold limit is sent to the threshold trigger level circuit 216 by register 212. Operation 516 uses comparator circuit 218 to compare the output of the sample-and-hold circuit 214 and the output of the threshold trigger level circuit 216. Comparator circuit 218 issues a "set error" signal to the controller if the output of the sample-and-hold circuit 214 exceeds the output of the threshold trigger level circuit 216. Operation 516 then surrenders control to operation 408.

Operation 408 determines whether the fly height during the write process 402 is acceptable for reliable data storage. Data is considered to have not been reliably stored to the disc 108 if the output of operation 516 exceeds the threshold limit (i.e., if the output of the sample-and-hold circuit 214 exceeds the output of the threshold trigger level circuit 216), and operational control branches NO such that operation 410 assumes control. Operation 410 institutes rewrite procedure 600. If the output of the operation 516 does not exceed the threshold limit (i.e., the output of the sample-and-hold circuit 214 does not exceed the output of the threshold trigger level circuit 216), the data is considered reliably written and operational control branches YES. Operation 412 then assumes control and the successful write process 402 is ended.

Figure 6:
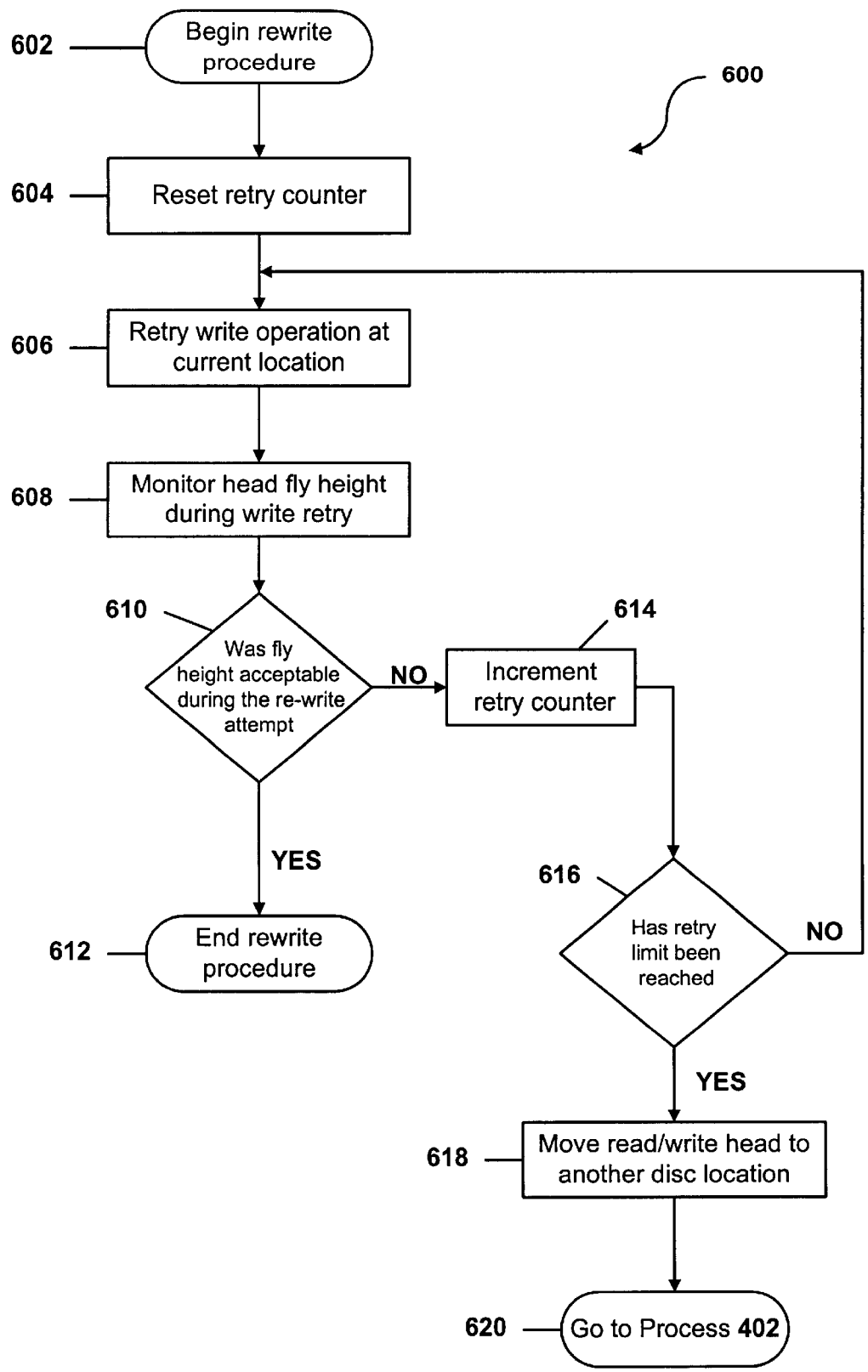
FIG. 6 is a flow chart of the operational process for rewriting data if a skip write is detected according to a preferred embodiment of the present invention.

FIG. 6 illustrates rewrite process 600. Rewrite process 600 is implemented if a skip write condition is detected according to a preferred embodiment of the present invention. Operation 602 begins the rewrite procedure after being triggered by operation 410 of the initial write process 400. Once the rewrite process 600 is started by operation 602, operation 604 assumes control and resets a "retry" counter. The retry counter is used to keep track of the number of attempts that have been made to write information to a specific, or desired location on the disc 108 surface. The manufacturer can configure the control system to write the data at another location on the disc 108 surface or return an error message among other things after a certain amount of rewrite attempts have failed.

Operation 606 assumes control after the retry counter is reset by operation 604. Operation 606 attempts to rewrite the data to the same location as attempted by the previous write process. Non-repeatable errors such as those caused by vibration, external shock, minor disc surface defect or a contaminate particle among others can be overcome by rewriting the data to the same location as the previous write process.

Operation 608 assumes control after operation 606 begins. Operation 608 monitors the write element fly height during the rewrite attempt of operation 606. Operation 608 completes detect operation 504 through compare operation 516 to monitor the write element fly height. In other words, operation 608 detects the frequency change caused by the parasitic capacitance (504), inputs the frequency change into the oscillator 206 (506), detects the frequency modulation of the oscillator 206 (508), filters the signal with a low-pass filter 210 (510), samples-and-holds the output of the low-pass filter 210 (512), adjusts the sample and hold time constant according to recording zone (514), and compares the output of the low-pass filter 210 to the predetermined threshold limit (516).

After operation 608 is completed, determination operation 610 ascertains whether the write element fly height was acceptable during the rewrite attempt. Operational control branches YES if the write element fly height was acceptable and the rewrite procedure is terminated by operation 612.

Operational control branches NO if the write element fly height was unacceptable and operation 614 assumes control. Operation 614 increments the retry counter. As previously mentioned, the retry counter is used to keep track of the number of attempts that have been made to write information to a specific location on the disc 108 surface. The manufacturer can configure the control system to write the data at another location on the disc 108 surface or return an error message among other things after a certain amount of rewrite attempts have failed.

Determination operation 616 assumes control after operation 614 increments the retry counter. Determination operation 616 compares the value stored in the retry counter to a predetermined retry limit. The retry limit can be set by the manufacturer to compensate for non-repeatable errors, such as vibration, external shock, minor disc surface defects, or contaminate particle among others, that cause a write operation to fail. By allowing multiple attempts at writing the data to the same location, the disc drive controller will not mark that disc location as damaged or defective until the retry limit has been reached.

Control branches NO if the retry counter has not reached the retry limit and the rewrite process repeats beginning at write operation 606. Control branches YES if the retry counter has reached the retry limit and operation 618 assumes control. Operation 618 moves the read/write head 118 over another location of the disc 108 surface. Operation 618 may also include marking the location where the rewrite process failed as being "damaged" or unusable so that future write operations will not be attempted at that location. Furthermore, operation 618 may also include, among others, automatically instituting remedial procedures or notifying the user to institute remedial procedures to repair the "damaged" location on the disc 108.

Operation 620 shifts control to write process 400 after operation 618 has repositioned the read/write head 118 over a new storage location on the disc 108. Operation 402 assumes control and attempts to write the data at the new location. Although operation 600 illustrates a preferred embodiment of the present invention, various other methods of rewriting data after a skip write error has been detected can be employed with embodiments of the present invention.

Embodiments of the present invention offer an apparatus and associated method of determining whether the write head remained in close proximity to the storage media surface in order to write data to the storage media. More specifically, embodiments of the present invention eliminate the need to read the information just written to the storage media surface in order to determine whether the write head properly wrote the data.

In summary, embodiments of the present invention can be viewed as an apparatus and associated method of determining the fly height of a read/write head (such as 118) relative to a data storage media (such as 108) in a data storage device (such as 100) by monitoring the parasitic capacitance (such as 222) between the write element (such as 204) and the data storage media. A method (such as shown in operational flow process 400) can be viewed as comprising the steps of writing data to a desired location on the data storage media (such as 108) and determining the fly height of the write element of the read/write head by monitoring the parasitic capacitance between the write element and the data storage media. The method (such as operational flow process 500) comprises the steps of converting the parasitic capacitance between the write element and the data storage media into a corresponding signal with a test circuit (such as 200), filtering the corresponding signal with a filter (such as 208), holding a sample of the corresponding signal for a time constant with a sample-and-hold circuit (such as 214), and comparing the sample of the corresponding signal to a predetermined threshold in a comparator circuit (such as 218). The time constant of the sample-and-hold circuit is chosen relative to the data zone to which data is being written. The predetermined threshold value corresponds to the amount of permissible deviation from a nominal fly height (such as 306).

Additionally, the corresponding signal as detected by the test circuit (such as 200) can be viewed as frequency dependent on the parasitic capacitance between the write element and the data storage media. The filter circuit can be viewed as being a low-pass filter circuit. Finally, the test circuit may also be viewed as forming a mode-rejection circuit relative to the write circuit.

Additionally, the method can be viewed as further comprising suspending the write operation (such as 402) if the read/write head's fly height exceeds the predetermined threshold limit, and if the fly height exceeds the threshold limit, implementing a rewrite procedure (such as shown in operational flow process 600). The rewrite procedure can be viewed as comprising the steps of resetting a retry counter, rewriting data to the desired location on the media, determining the fly height while the data is rewritten by monitoring parasitic capacitance between the write element and the storage media, determining whether the fly height exceeds the predetermined threshold limit, suspending the rewrite procedure if the fly height exceeds the predetermined threshold limit, incrementing the retry counter if the fly height exceeds a predetermined threshold limit, comparing the retry counter to a retry limit, rewriting data at the desired location on the media if the retry counter has not reached the retry limit, and repeating the rewrite process at another location on the storage media if the retry counter reaches the retry limit.

Additionally, the circuit of the apparatus can be viewed as having a capacitive component and an inductive component coupled to the write circuit. The capacitive component and inductive component are connected to an oscillator (such as 206), the oscillator is connected to a frequency modulation detector (such as 208), the frequency modulation detector is connected to a filter (such as 210) and the filter is connected to a sample-and-hold circuit (such as 214). The sample-and-hold circuit receives a time constant from a register (such as 212). The time constant is set relative to a data zone on the data storage media to which data is being written. The register circuit also sends a threshold limit to a threshold trigger circuit (such as 216). The output of the sample-and-hold circuit and the output of the threshold trigger circuit are connected to the input of a comparator circuit (such as 218).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to an apparatus and method for determining the fly height of a read/write head, it will be appreciated by those skilled in the art that the teachings of the present invention can be applied to other systems without departing from the scope and spirit of the present invention. Numerous other changes may be made which will readily suggest themselves to those skilled in the art and which are encompassed in the spirit of the invention disclosed and as defined in the appended claims.

What is claimed is:

1. An apparatus for determining a fly height of a read/write head relative to a data storage media in a data storage device, the apparatus comprising:
    a circuit adapted for detecting a parasitic capacitance between the read/write head and the storage media and for comparing the parasitic capacitance to a predetermined threshold limit, wherein the circuit comprises a capacitive component and an inductive component, the capacitive component and the inductive component connected to an oscillator, the oscillator connected to a frequency modulation detector, the frequency modulation detector connected to a filter, the filter connected to a sample-and-hold circuit having a time constant, the sample-and-hold circuit connected to a comparator, and a threshold trigger level circuit, the threshold trigger level circuit connected to the input of the comparator.

2. The apparatus of claim 1, wherein the circuit is a mode-rejection circuit relative to the write circuit.

3. The apparatus of claim 1 wherein the time constant is set relative to a data zone on the data storage media to which data is being written.

4. A method of determining a fly height of a read/write head relative to a data storage media in a data storage device, wherein the data storage device comprises a controller and a write circuit; the read/write head comprises a write element and a write element electrical lead connecting the write element to the controller; and the data storage media comprises a data zone,
    the method comprising the steps of:
    a) writing data to a desired location on the data storage media; and
    b) determining the fly height of the read/write head by monitoring a parasitic capacitance between the read/write head and the data storage media, step (b) comprising:
        (b)(i) converting the parasitic capacitance within the write circuit into a corresponding signal with a test circuit;
        (b)(ii) filtering the corresponding signal;
        (b)(iii) holding a sample of the corresponding signal for a time constant; and
        (b)(iv) comparing the sample of the corresponding signal to a predetermined threshold.

5. The method of claim 4 wherein the corresponding signal in converting step (b)(i) is frequency dependent on the parasitic capacitance between the write element and the data storage media.

6. The method of claim 4 wherein filtering step (b)(ii) includes passing the corresponding signal through a low-pass filter circuit.

7. The method of claim 4 wherein holding step (b)(iii) is implemented using a sample-and-hold circuit.

8. The method of claim 4 wherein holding step (b)(iii) further comprises setting the time constant relative to the data zone to which data is being written.

9. The method of claim 4 further comprising tuning the test circuit to form a mode-rejection circuit relative to the write circuit.

10. The method of claim 4 further comprising the steps of:
    (c) suspending writing step (a) if the fly height exceeds a predetermined threshold limit; and,
    (d) if the fly height exceeds the threshold limit, then implementing a rewrite procedure.

11. The method of claim 10 wherein the rewrite procedure of step (d) further comprises steps of:
    (d)(i) resetting a retry counter;
    (d)(ii) rewriting data at the desired location on the media;
    (d)(iii) determining the fly height while the data is rewritten by monitoring the parasitic capacitance between the write element and the data storage media;
    (d)(iv) determining whether the fly height exceeds the predetermined threshold limit;
    (d)(v) suspending the rewrite procedure if the fly height exceeds the predetermined threshold limit;
    (d)(vi) incrementing the retry counter if the fly height exceeds a predetermined threshold limit;
    (d)(vii) comparing the retry counter to a retry limit;
    (d)(viii) rewriting data at the desired location on the storage media if the retry counter has not reached the retry limit; and
    (d)(ix) repeating writing step (a) through implementing step (d) at another location on the storage media if the retry counter reaches the retry limit.

12. An apparatus for detecting a skip-write error occurring during a data storage device write operation comprising:
    a data storage media separated from a write element by a fly height; and
    means for determining the fly height by detecting a parasitic capacitance between the write element and the data storage media.

13. The apparatus according to claim 12 wherein the means for determining comprises:
    a circuit detecting the parasitic capacitance between the write element and the storage media and comparing the parasitic capacitance to a predetermined threshold limit.

14. The apparatus according to claim 13 wherein the circuit comprises a capacitive component and an inductive component connected to an oscillator, the oscillator being connected to a frequency modulation detector connected to a sample-and-hold circuit having a time constant, the sample-and-hold circuit being connected to a comparator, and a threshold trigger level circuit connected to an input of the comparator.

* * * * *